United States Patent [19]
Guillotel et al.

[11] Patent Number: 6,097,832
[45] Date of Patent: Aug. 1, 2000

[54] METHOD OF ESTIMATION AND OF HIERARCHISED CODING OF THE MOTION OF IMAGE SEQUENCES

[75] Inventors: Philippe Guillotel; François Bourdon, both of Rennes, France

[73] Assignee: Thomson Consumer Electronics, Courbevoie, France

[21] Appl. No.: 08/078,269

[22] PCT Filed: Nov. 24, 1992

[86] PCT No.: PCT/FR92/01086

§ 371 Date: Jul. 7, 1993

§ 102(e) Date: Jul. 7, 1993

[87] PCT Pub. No.: WO93/11502

PCT Pub. Date: Jun. 10, 1993

[30] Foreign Application Priority Data

Nov. 27, 1991 [FR] France .................................. 91 14625

[51] Int. Cl.[7] .............................. G06T 7/20; G06T 9/00
[52] U.S. Cl. ......................... 382/107; 382/236; 382/240; 348/416
[58] Field of Search .............................. 382/56, 236, 240, 382/107; 358/133, 136; 348/402, 416

[56] References Cited

U.S. PATENT DOCUMENTS

| | | | |
|---|---|---|---|
| 4,849,810 | 7/1989 | Ericsson .................................. | 348/416 |
| 4,853,775 | 8/1989 | Rouvrais et al. ...................... | 348/699 |
| 5,089,887 | 2/1992 | Robert et al. .......................... | 348/699 |
| 5,144,423 | 9/1992 | Knauer et al. ......................... | 348/402 |

FOREIGN PATENT DOCUMENTS 9103797  3/1991  WIPO .

OTHER PUBLICATIONS

IEEE Transactions on Pattern Analysis and Machine Intelligence, vol. 11, No. 7, Jul. 1989, New York, US, pp. 742–748, P.Strobach "Quadtree–Structured Linear Prediction Models for Image Sequence Processing.".

*Primary Examiner*—Jon Chang
*Attorney, Agent, or Firm*—Oblon, Spivak, McClelland, Maier & Neustadt, P.C.

[57] ABSTRACT

The present invention relates to a method of estimation and of hierarchised coding of the motion of image sequences, consisting in partitioning the current image into macroblocks, the macroblocks into four blocks and so on, and then determining at each level a motion-vector field associated with this division, by using an iterative and recursive estimation algorithm initialised with motion vectors estimated at the previous level, and in determining a final motion-vector field from the p resulting motion-vector fields. The motion-vector field is determined using the differences in luminances between blocks corresponding in the successive images through the estimated displacement vectors of the p levels of division corresponding to each block of minimum size, and by choosing as motion vector associated with the block of minimum size the one for which the difference in luminance is a minimum over this block. The invention applies in particular to the coding of HD-MAC television images.

11 Claims, 5 Drawing Sheets

METHOD OF ESTIMATION AND OF HIERARCHISED CODING OF THE MOTION OF IMAGE SEQUENCES

BACKGROUND OF THE INVENTION

1. Field of the Invention

The present invention relates to a method of estimation and of hierarchised coding of the motion of image sequences, used in particular in image transmission apparatuses with a view to decreasing the information rate.

2. Discussion of the Background

A method and a device for estimation and hierarchised coding of the motion of image sequences have been proposed in French Patent Application No. 89 11328 filed in the name of THOMSON CONSUMER ELECTRONICS, which corresponds to U.S. patent application Ser. No. 07/678,278, now allowed. This method is characterised in that it consists, at a first level, in partitioning the current image into macroblocks of $2^{p+1} \times 2^{p+1}$ pixels and in determining a first motion-vector field associated with this division into macroblocks, by using an iterative and recursive estimation algorithm initialised with motion vectors estimated for the previous image, then, at a second level, in partitioning each of the macroblocks into quadrants and in determining, for the blocks which result therefrom, a second motion-vector field by using the same estimation algorithm but initialised with vectors from the field of motion which were estimated at the previous level, then at $i^{th}$ level, i=3 to p, in partitioning each of the blocks considered at level i−1 into quadrants and in determining, for the blocks which result therefrom, an $i^{th}$ motion-vector field by using the same estimation algorithm initialised with the vectors from the field of motion which were estimated at the previous level, the blocks of minimum size being blocks of $2^{1+1} \times 2^{1+1}$ pixels, and in determining a final motion-vector field from the p resulting motion-vector fields by choosing the lowest level of division for which the motion vector associated with the corresponding block leads to the minimisation of a criterion expressing the differences in luminance between blocks corresponding in the successive images through the estimated displacement vectors.

This process of estimation makes it possible to enhance the convergence of the recursive motion-estimation algorithm used and makes it possible optimally to adapt the motion-estimation algorithm to the "Quadtree" type coding which will be done subsequently of the resulting motion field.

This process of estimation can be used, among other things, in the context of HD-MAC.

SUMMARY OF THE INVENTION

The purpose of the present invention is to afford various improvements to the method of estimation and of hierarchised coding of the motion of image sequences, described in French Patent Application No. 89 11328.

Accordingly, the subject of the present invention is a method of estimation and of hierarchised coding of the motion of image sequences, consisting:

at a first level, in partitioning the current image into macroblocks of $2^p \times 2^p$ pixels and in determining a first motion-vector field associated with this division into macroblocks, by using an iterative and recursive estimation algorithm initialised with motion vectors estimated for the previous image, then, at a second level, in partitioning each of the macroblocks into quadrants and in determining, for the blocks which result therefrom, a second motion-vector field by using the same estimation algorithm but initialised with vectors from the field of motion which were estimated at the previous level, then at $i^{th}$ level, i=3 to p, in partitioning each of the blocks considered at level i−1 into quadrants and in determining, for the blocks which result therefrom, an $i^{th}$ motion-vector field by using the same estimation algorithm initialised with the vectors from the field of motion which were estimated at the previous level, the blocks of minimum size being blocks of $2^p \times 2^p$ pixels, and in determining a final motion-vector field from the p resulting motion-vector fields, characterised in that the motion-vector field is determined by using the differences in luminance between blocks corresponding in the successive images through the estimated displacement vectors of the p levels of division corresponding to each block of minimum size and by choosing as motion vector associated with the block of minimum size the one for which the difference in luminance is a minimum over this block.

This new determination of the final motion-vector field makes it possible to simplify the system, in particular at the level of its production, and to ensure better convergence of the calculations.

BRIEF DESCRIPTION OF THE DRAWINGS

Other characteristics and advantages of the present invention will emerge from reading the description given below of various embodiments, this description being given with reference to the attached figures in which.

DESCRIPTION OF THE PREFERRED EMBODIMENTS

A type of motion-estimation algorithm which can be used in the context of the present invention will be described first. This algorithm is derived from the spatio-temporal algorithm described in particular by A. N. Netravali and J. D. Robbins in an article entitled "Motion compensated television coding part.1" extracted from "The Bell system technical journal" volume 58, No. 3, March 1979.

Figure 1:
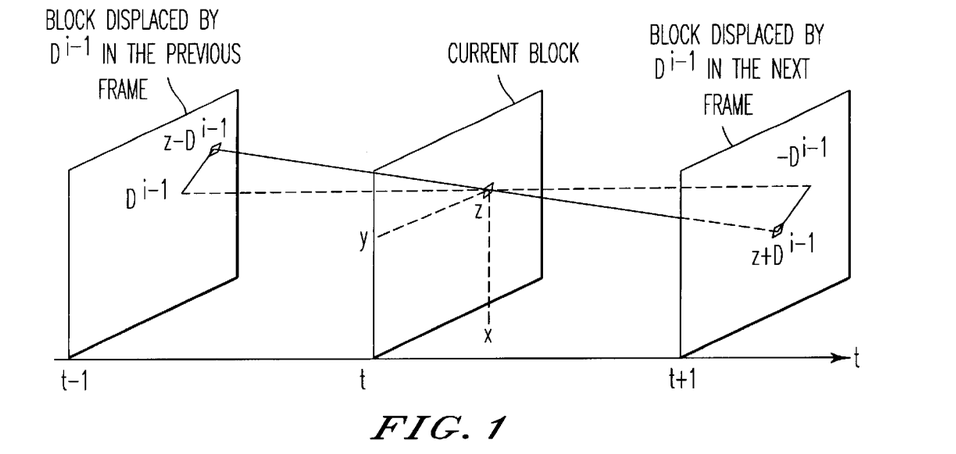
FIG. 1 illustrates the information used to estimate a motion field according to the invention, in the case of a current block.

The algorithm of the present invention allows a so-called "symmetric" estimation of motion. A symmetric estimation is used principally for the current blocks lying in the middle of a frame or image, as represented in FIG. 1. In this case, the estimation of motion of the blocks of the current frame at iteration i is done using the previous frame occurring at the instant t−1 and the next frame occurring at the instant t+1. The gradients are also calculated in the previous and next frames and the displacement vector at iteration i is then calculated from the displacement vector of the current block estimated at the previous iteration i−1 through the following equations (which take into account the differences in luminance between the pixels of the current block and the pixels of the corresponding blocks displaced by this previously estimated vector, on the one hand in the previous frame and on the other hand in the next frame):

$$D_x^i = D_x^{i-1} - \frac{\sum [DFD(z-D^{i-1}, t-1)\text{sg}(\text{grad}^x(z-D^{i-1}, t-1)) - DFD(z+D^{i-1}, t+1)\text{sg}(\text{grad}^x(z+D^{i-1}, t+1))]}{\sum [\text{grad}^x(z-D^{i-1}, t-1) + \text{grad}^x(z+D^{i-1}, t+1)]}$$
(i)

$$D_y^i = D_y^{i-1} - \frac{\sum [DFD(z-D^{i-1}, t-1) \cdot \text{sg}(\text{grad}^y(z-D^{i-1}, t-1)) - DFD(z+D^{i-1}, t+1)\text{sg}(\text{grad}^y(z+D^{i-1}, t+1))]}{\sum [\text{grad}^y(z-D^{i-1}, t-1) + \text{grad}^y(z+D^{i-1}, t+1)]}$$

in which:

$D_x^i$ and $D_y^i$ as well as $D_x^{i-1}$ and $D_y^{i-1}$ are respectively the horizontal and vertical components of the motion vectors $D^i$ and $D^{i-1}$ for a block of pixels at iteration i and at the previous iteration i−1 respectively;

DFD ($z-D^{1-1}$, t−1) corresponds to the displaced interframe difference for pixel z, that is to say the difference between the luminance of pixel z in the current frame at the instant t and the luminance of the displaced pixel corresponding to z in the previous frame (at the instant t−1), that is to say z displaced by the motion vector $D^{i-1}$ calculated at the previous iteration:
DFD($z-D^{i-1}$, t−1)=I (z, t)−I ($z-D^{i-1}$, t−1) where I(z, t) represents the luminance value of a pixel z at the instant T DFD($z+D^{i-1}$, t+1) represents the displaced interframe difference for pixel z, that is to say the difference between the luminance of pixel z in the current frame at the instant t and the luminance of the displaced pixel corresponding to z in the next frame (at the instant t+1), that is to say to z displaced by the symmetric motion vector $D^{i-1}$ calculated at the previous iteration;

grad.$^x$($z-D^{i-1}$, t−1), grad.$^x$($z+D^{i-1}$, t+1), grad.$^y$($z-D^{i-1}$, t−1), grad.$^y$($z+D^{i-1}$, t+1)

represent the horizontal and vertical components respectively of the luminance gradient of the displaced pixels, calculated in the previous frame and in the next frame respectively, and where sg ( . . . ) is the notation for "sign of" the quantity which follows.

In FIG. 1 there has been represented the position of the displaced blocks in the previous frame and in the next frame, corresponding to a current block lying in the middle of the image for which the displacement vector estimated at the previous iteration is $D^{i-1}$ from the previous frame to the current frame and hence $-D^{1-1}$ from the next frame to the current frame, assuming a symmetric displacement.

By examining a detail of the neighbourhood of $z-D^{i-1}$ or $z+D^{i-1}$, it is seen that, in general, the displacement vector leads to a displaced pixel $z-D^{i-1}$ or $z+D^{1-1}$ having a position which does not correspond to integer values of x and y. Accordingly, the luminance values of the four points of the neighbourhood of $z-D^{i-1}$ or $z+D^{i-1}$, namely the points I1, I2, I3 and I4 as represented in FIG. 2, are used to calculate the luminances of the displaced pixels and to calculate the gradients.

In this case, the interpolation of the luminance I is carried out by forming a weighted sum of I1, I2, I3 and I4.

Figure 2:
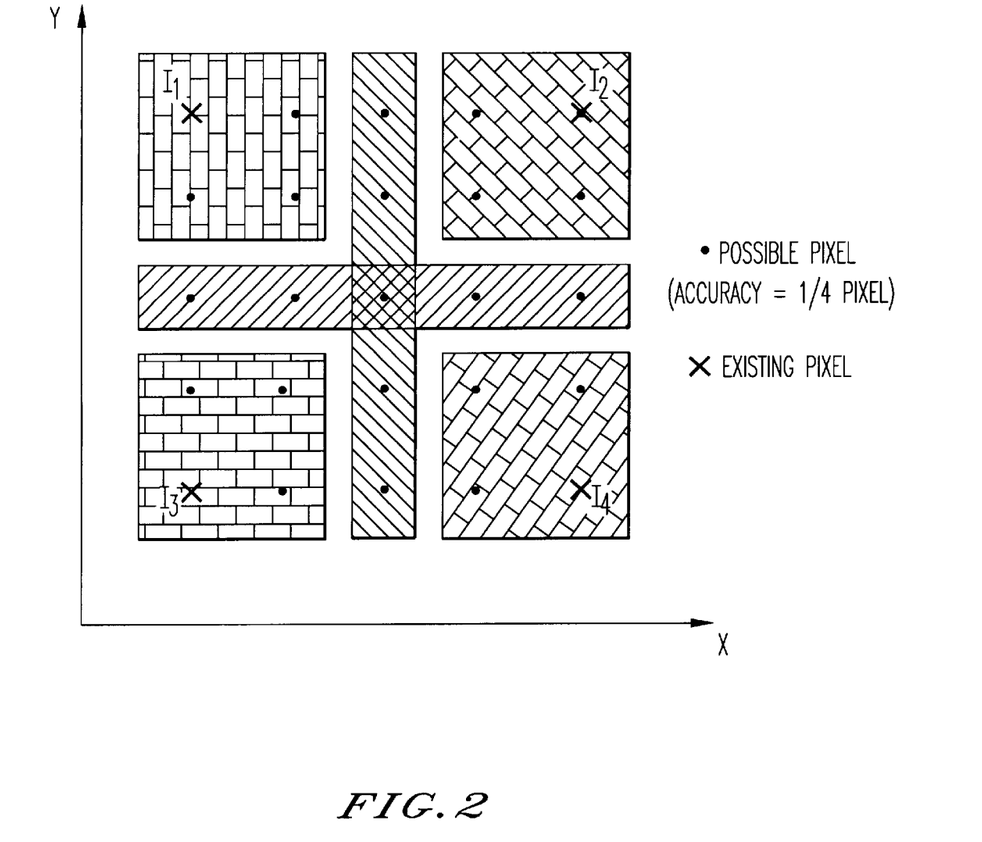
FIG. 2 illustrates the calculation of the gradients in accordance with the present invention.

For the gradient, according to the present invention, more complex formulae are used which take into account the position of the displaced pixel $Z-D^{i-1}$ or $Z+D^{i+1}$ with respect to the points I1, I2, I3 and I4, as represented in FIG. 2.

If the calculations are carried out with an accuracy of a quarter of a pixel, the displaced pixels can have, between the existing pixels I1, I2, I3, I4, a certain number of positions such as represented by points in FIG. 2. Depending on the position of the displaced pixel with respect to the existing pixel, various formulae will be used to calculate the gradients in x and in y.

Thus, if the displaced pixel lies in the neighbourhood of I1, the value of the gradient is given by:

Gx=(I2−I1) and Gy=(I1−I3).

If the displaced pixel lies in the neighbourhood of I2:

Gx=(I2−I1) and Gy=(I2−I4).

If the displaced pixel lies in the neighbourhood of I3:

Gx=(I4−I3) and Gy=(I1−I3).

If the displaced pixel lies in the neighbourhood of I4:

Gx=(I4−I3) and Gy=(I2−I4).

If the displaced pixel lies in the middle portion between I1 and I3 or between I2 and I4:

Gx=((I2−I1)+(I4−I3))/2 and Gy=(I1−I3) or (I2−I4).

If the displaced pixel lies in the middle portion between I1 and I2 or between I4 and I3:

Gx=(I2−I1) or (I4−I3), Gy=((I1−I3)+(I2−I4) )/2.

If the displaced pixel is equidistant from I1, I2, I3, I4

Gx=((I2−I1)+(I4−I3))/2

Gy=((I1−I3)+(I2−I4))/2

Gx and Gy in the above equations correspond in fact to grad.$^x$($Z-D^{i-1}$, t−1) and grad.$^y$($Z-D^{i-1}$, t−1) with I1, I2, I3 and I4 at t−1, and similarly for ($Z+D^{i-1}$, t+1).

Figure 3:
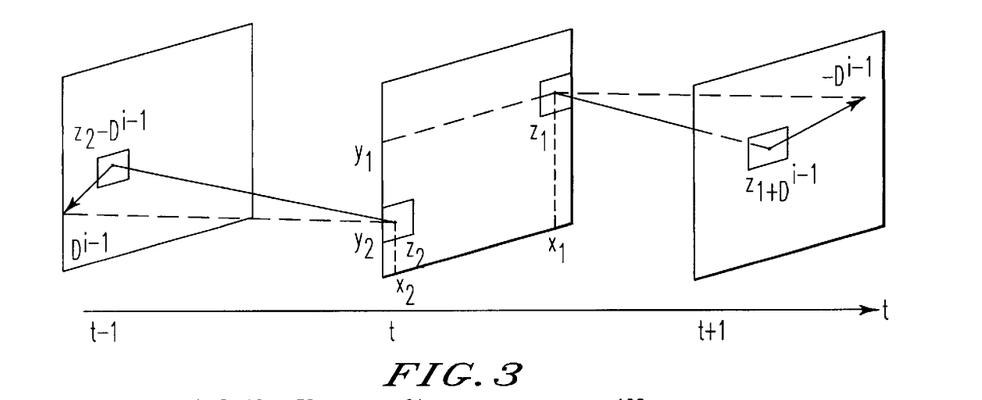
FIG. 3 illustrates the information used to estimate a motion field in the case of blocks lying near the edge of the image or frame.
Figure 4:
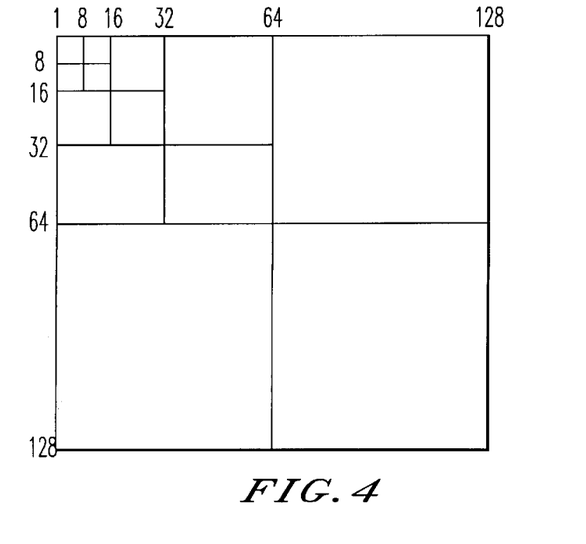
FIG. 4 illustrates the splitting of a macroblock into smaller blocks in accordance with five hierarchised levels.

However, in the case of the blocks at the edges of the image, it is not always possible to produce a symmetric estimate. A calculated vector may very well point outside the image to one of the two frames adjacent to the current frame. Thus, as represented in FIG. 3, the pixel Z2 of a block lying on the left edge of the image points outside the next frame t+1 whilst the pixel Z1 belonging to a block at the right edge of the image points outside the previous frame occurring at the instant t−1. In this case, in order to have available predictors for the lower levels, a non-symmetric estimate of motion is produced, that is to say an estimate of motion between the current frame and the next frame or between the current frame and the previous frame. The differences in luminance between blocks or DFD and the gradients are calculated over a single frame and set to zero or to the same value for the other frame so as to be able to use the same type of equation as the equations (1) above and preserve the same general architecture for the system.

The recursive motion-estimation algorithm such as described above is therefore used in the method of estimation and of hierachised coding of the motion of image sequences according to the present invention. In order optimally to adapt this motion-estimation algorithm to the "quadtree" type coding which will be done subsequently of the resulting motion field, the blocks of a level are the result of the dividing into four of a block of the immediately higher level, as represented in FIG. 3 which illustrates the various sizes of blocks resulting from the division. Moreover, recursivity is obtained by using the motion field obtained at a given level of the hierarchy in order to calculate the motion field of the immediately lower level. Thus, for the calculations within a given level, the estimate of motion for a block is independent of that of the other blocks of the neighbourhood at the same level.

The principal steps of the method of estimation and of hierarchised coding of the motion of image sequences according to the present invention will now be described with reference more particularly to FIG. 5. These various steps can be implemented with a HRB (for hierarchical recursive blocks) motion estimator. The principal steps of the method according to the present invention include, first, a motion-estimation step which is repeated for the n levels and is followed by a convergence step which gives a final motion-vector field and ends finally with a selection step, this selection step being in fact optional depending on the application concerned.

The motion-estimation step, namely, the first step of FIG. 5, will be described according to various embodiments of the invention.

Since the maximum size of the image element blocks which is recognised for the coding is 128×128 pixels and the minimum size, in the embodiment represented, is 8×8 pixels but may reach a pixel through successive dividing of each block into 4 quadrants, the calculation of the displacement vectors is performed according to the invention firstly for the blocks of 128×128 pixels (level 1) then of 64×64 pixels (level 2), then of 32×32 pixels (level 3), then of 16×16 pixels (level 4) and finally of 8×8 pixels (level 5), independently of the contents of the image. For initialisation for the current image, the N initial values for the largest blocks at the first level (128×128) are zero for the first image of the sequence, then equal to the N motion vectors occurring most or temporal predictors in the same macroblock of the previous image. Then the N initial values gathered for a block of size n×n originate from the previous level, hence from a block of size 2n×2n. These values are the estimated displacements for the N closest blocks of greater size. In general, N is chosen equal to 4, but other values may be envisaged without departing from the scope of the present invention.

Figure 6:
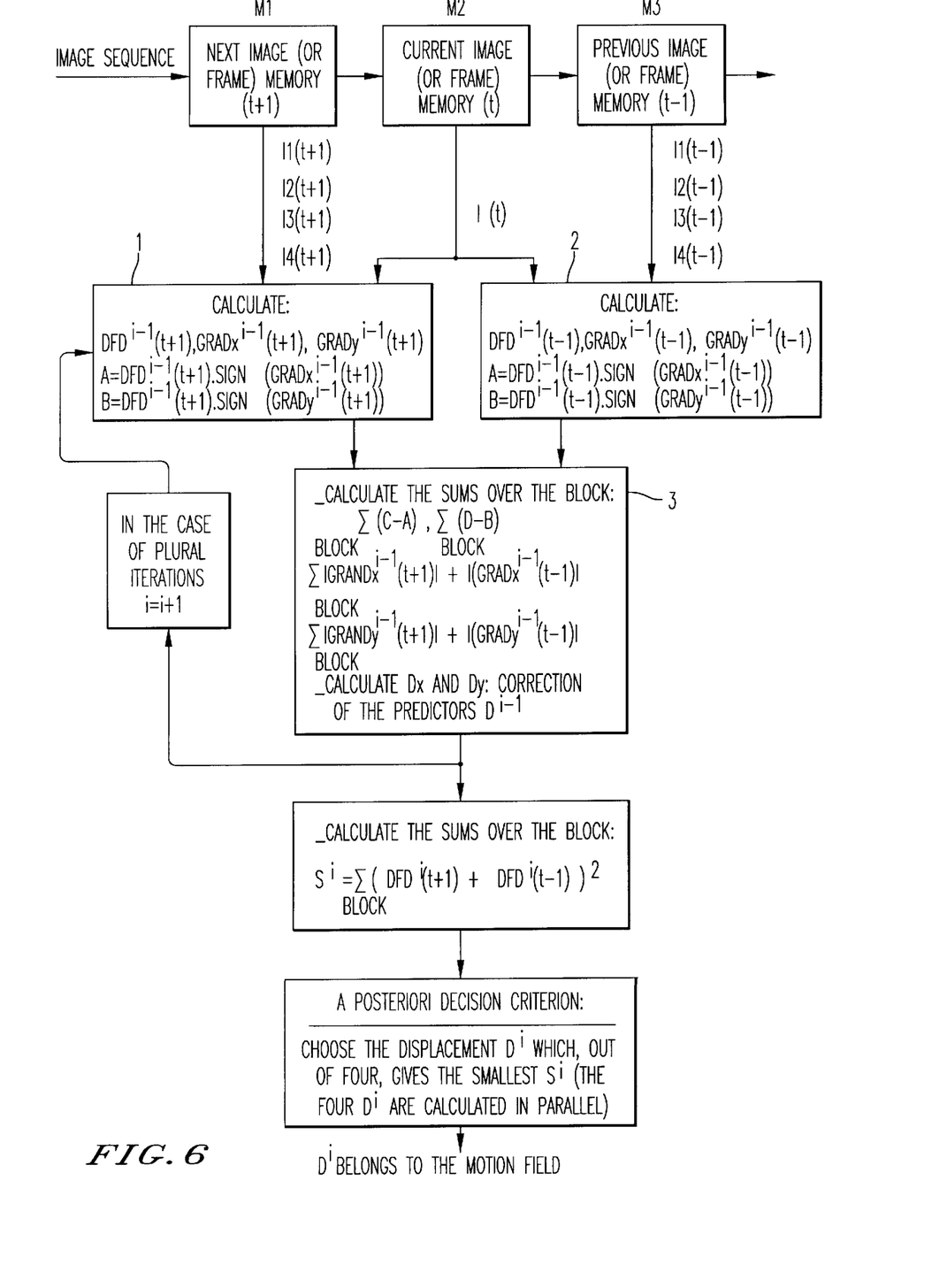
FIG. 6 details the steps of the estimation of motion at a given level according to a first embodiment of the present invention, and FIG. 7 details the steps of the estimation of motion at a given level according to another embodiment of the present invention.

A step of the motion-estimation method at a level n is described in more detail below with reference to FIG. 6. In this case, an a posteriori calculation of the displacement vectors has been described. As represented in FIG. 6, the image sequences are stored in three memories or frame or image memory zones which therefore contain the next image M1 at t+1, the current image M2 at the instant t and the previous image M3 at the instant t−1 as well as the luminance values of the four pixels surrounding the displaced pixel Z+D$^{i-1}$ on output from M1, the luminance value I(t)=I(z, t) on output from M2 and the luminance values of the four pixels surrounding the displaced pixel Z−D$^{i-1}$ on output from M3.

A first step of pointwise calculation gives the values of the displaced inter-frame differences and of the gradients starting from the luminance values arising from the memories and from the initial displacement vectors, with respect to the previous image at t−1 and with respect to the next image at t+1. More specifically, using the information stored in M1 and M2, in the blocks labelled 1 and 2 we calculate:

DFD$^{i-1}$ (t+1), Grad$^{i-1}_x$ (t+1), Grad$^{i-1}_y$ (t+1)

A=DFD$^{i-1}$ (t+1).sign (Grad$^{i-1}_x$ (t+1))

B=DFD$^{i-1}$ (t+1).sign (Grad$^{i-1}_y$ (t+1))

and by using the information stored in M2 and M3:

DFD$^{i-1}$ (t−1), Grad$^{i-1}_x$ (t−1), Grad$^{i-1}_y$ (t−1)

C=DFD$^{i-1}$ (t−1).sign (Grad$^{i-1}_x$ (t−1))

D=DFD$^{i-1}$ (t−1).sign (Grad$^{i-1}_y$ (t−1))

The next step then consists in calculating the components of the displacement vectors D$^i_x$ and D$^i_y$ according to the iterative formulae given above after having calculated the partial sums of the differences such as C-A and B-D over the whole of the corresponding block at level n.

Thus, as represented in FIG. 6, in block 3 we calculate:

Σ (C-A), Σ (D-B), block block

Σ :Grad$^{i-1}_x$ (t+1):+:Grad$^{i-1}_x$ (t−1): block

Σ :Grad$^{i-1}_y$ (t+1):+:Grad$^{i-1}_y$ (t−1): block and the correction of the predictors D$^{i-1}$ is performed.

When the N initial values for each current block (N in general being chosen equal to 4) corresponding to blocks of the neighbourhood of this current block but of a different level, that is to say of immediately greater size, make it possible to initialise four separate estimates of motion for this block (one only has been represented) and give, when the iterative formulae of the algorithm have converged, four independent values of updated motion vectors which supplement the values of the vectors of previous levels.

The squares of the intermediate DFD inter-frame differences used for the updates are calculated, stored in memory and added up for the whole of the block so as to choose for each block, on completion of the 4 calculations, the "best" displacement from the four new updated displacement vectors, that is to say that for which the sum S$^i$ of the squared inter-frame differences for this block is a minimum. This best vector then constitutes one of the vectors of the motion field calculated at level n and denoted DV128 or DV64 or DV32 or DV16 or DV8 depending on the iteration level.

Figure 7:
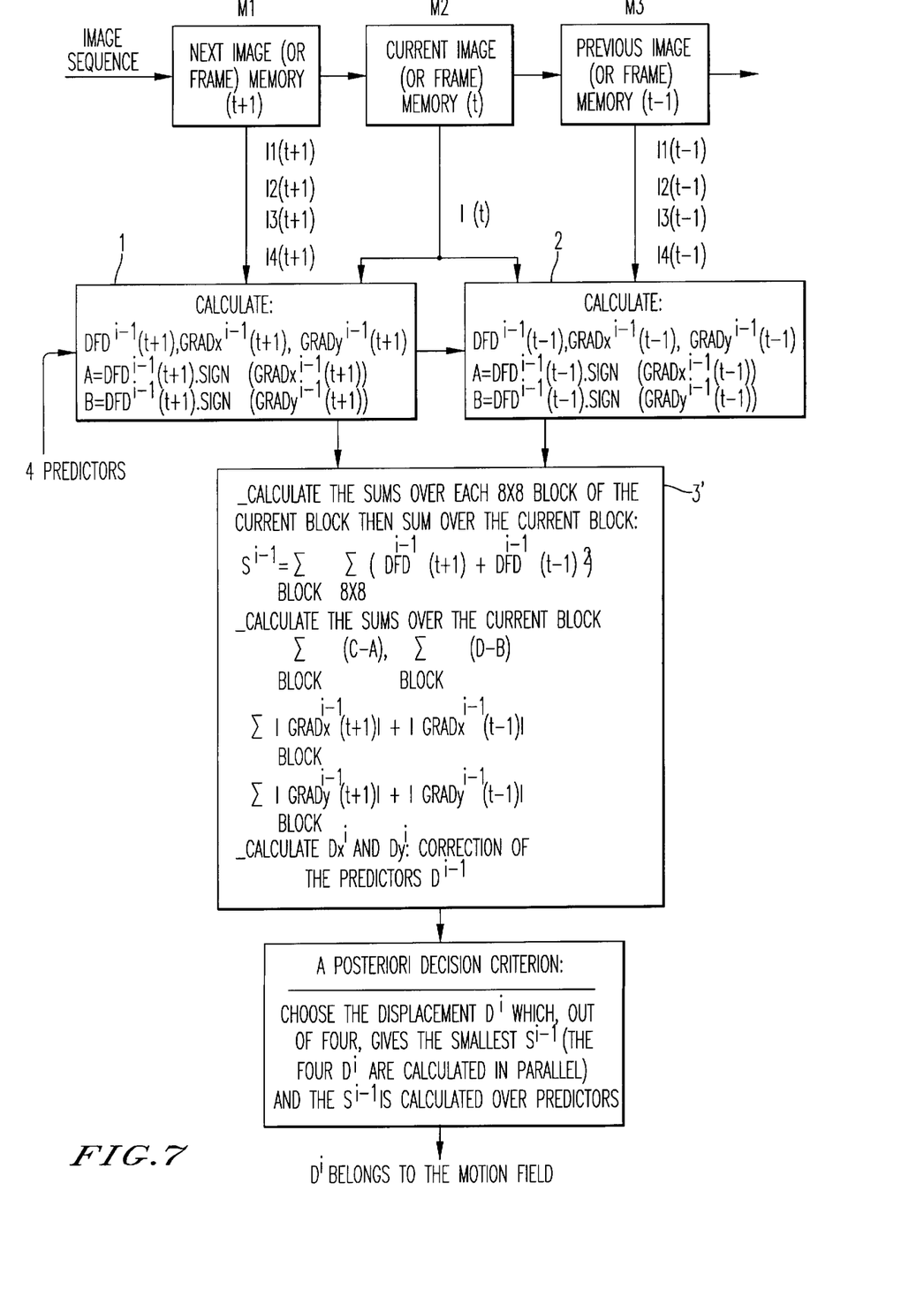

According to another embodiment represented in FIG. 7, an a priori calculation can be carried out. In this case, a decision criterion is applied directly to the N initial values used for each current block, by using a calculation of DFD and by choosing as vector that which gives the minimum DFD. A correction is carried out on this chosen vector so as to obtain the components of the displacement vector D$^i_x$ and D$^i_y$ with the iterative formulae given above. More precisely and as represented in FIG. 7, in blocks 1 and 2, the same calculation is performed as in blocks 1 and 2 of FIG. 6. Then in blocks 3', the sums are calculated over each 8×8 block of the current block, then a sum over the current block is performed, namely:

S$^{i-1}$=Σ 1DFD$^{i-1}$ (t+1)+DFD$^{i-1}$ (t−1)1$^2$ block 8×8

(DFD$^{i-1}$ being the DFD calculated with the vectors D$^{i-1}$ and similarly for Grad$^{i-1}$).

Next, the sums are calculated over the current block as in the case of block 3 of FIG. 3, and D$^i_x$ and D$^i_y$ are calculated, namely the correction of the predictors D$^{1-1}$.

In the two cases described above, the correction of the displacement vector has been carried out using a gradient calculation. However, it is clear to the expert that the correction of a motion vector can be carried out by block matching over a limited window, as is described in the literature, in the following articles in particular:

- J. R. Jain and A. K. Jain IEEE Trans. or Comm. COM-29 No. 121 "Displacement Measurement and its application in interframe image coding";
- Y. Niromiga and Y. Ohtsuk IEEE Vol COM-30 January 1982 "A motion compensated interframe coding scheme for television pictures".

On completion of this motion-estimation phase, which can be carried out in a different way to that described above, a field of different motion vectors corresponding to each level, that is to say to each size of block, is available in order to determine the final motion field adapted to the construction of the coding tree such as a "quadtree" type coding tree.

Once the five motion fields have been determined, the convergence step therefore consists in determining the final motion field. In accordance with the present invention, the determination of the final motion field is done by examining, for each block of minimum size, namely for each block of size 8×8 pixels in the embodiment represented, the various motion vectors DVI which have been established at each level of division. Thus, for each block of minimum size, there is a vector DV128 giving a DFD 128 established during initialisation of the procedure, namely at level 1 then a vector DV64 giving a DFD 64 established at level 2, a vector DV32 giving a DFD 32 established at level 3, a vector DV16 giving a DFD 16 established at level 4, and a vector DV8 giving a DFD 8 established at level 5. Thus, for these five vectors, their DFD is compared and the vector DVI giving the smallest DFDI is chosen as vector assigned to this block of minimum size in the final motion-vector field. This same selection is performed for all the 8×8 blocks of a macroblock, as represented in the convergence portion of FIG. 5.

Figure 5:
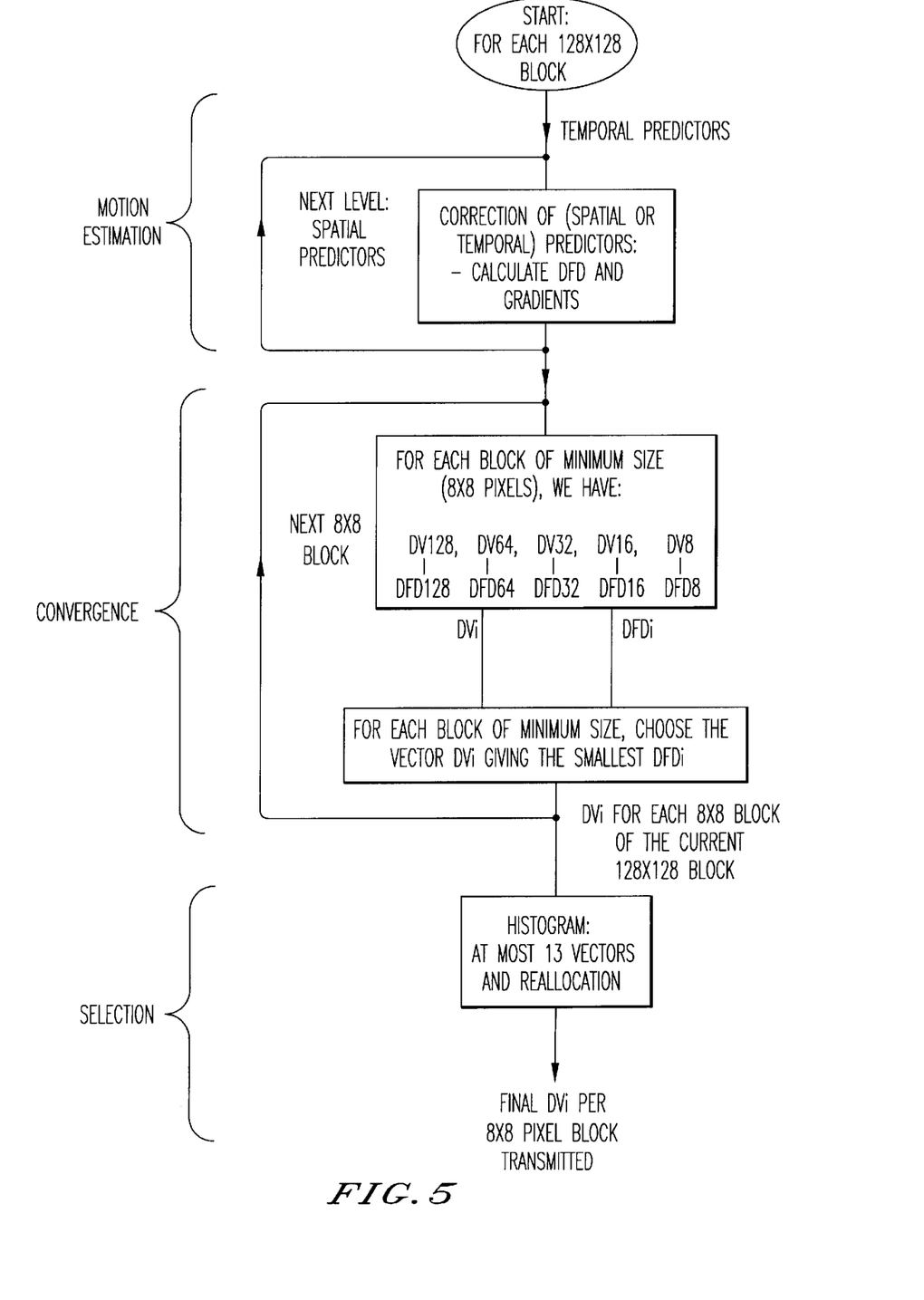
FIG. 5 is a flowchart detailing the various steps of the method of the present invention.

As represented in FIG. 5, the method according to the present; invention can end with a selection step. This step is discretionary and in fact has the purpose of rendering homogeneous the resulting motion fields and of increasing the effectiveness of a rate-reducing coding. This step consists in producing a histogram of the vectors present in an image macroblock and in then keeping only the majority vectors. Thus, only the motion vectors corresponding to a number of peaks of the histogram greater than a given threshold are kept, this threshold corresponding to a number of motion vectors which is regarded as sufficient. For the other vectors, i.e. the least frequent vectors, they are replaced with those value vectors, from among the selected vectors, which are closest so as to perform a reallocation. In the context of a HD-MAC application, this selection step is not carried out for the even images, but a reallocation is performed on each even frame of the even images from the 9 blocks neighbouring the block considered in the previous (odd) image. In the embodiment represented in FIG. 5, a histogram has been produced over at most 13 vectors, with a reallocation. Last, the final motion vector is transmitted.

On the other hand, it is possible to use the above method of estimation while dropping down to a block size equivalent to a pixel. In this case, a non-symmetric estimation algorithm is used and no histogram is produced.

What is claimed is:

1. A method of determining motion of a sequence of images, comprising the steps of:
   partitioning, at a first level, a current image into macroblocks of $2^p \times 2^p$ pixels and estimating a first motion-vector field associated with said macroblocks at the first level using an iterative and recursive estimation algorithm initialized with motion vectors estimated for a previous image;
   partitioning, at a second level, each of the macroblocks into quadrants and estimating, for blocks which result therefrom, a second motion-vector field using the same estimation algorithm used for the first level initialized with the vectors which were estimated at the first level;
   partitioning, at an $i^{th}$ level, i=3 to p, each of the blocks at level i−1 into quadrants and estimating, for blocks which result therefrom, an $i^{th}$ motion-vector field using the same estimation algorithm used for the i−1 level initialized with the vectors which were estimated at the i−1 level, a minimum size of the $i^{th}$ level blocks being no smaller than $2^1 \times 2^1$ pixels;
   determining differences in luminance between the pixels of successive images of corresponding blocks at a highest level of partitioning which are displaced by each of the estimated motion vector fields of the p levels of division;
   summing, for each of said estimated motion vector fields, said differences in luminance of the pixels within the blocks at the highest level of partitioning; and
   selecting, for each of said blocks at the highest level of partitioning, a final motion vector field, from said motion vector fields, which has a smallest sum of said differences.

2. A method according to claim 1, wherein:
   the estimation algorithm uses, for the estimation of said motion vector fields at the iteration index i, N motion vectors determined at iteration i−1 amongst which is chosen the motion vector field which results in a minimization of criterion expressing the differences in luminance between blocks corresponding in the successive images through the corresponding estimated displacement vectors, the vector chosen being corrected as a function of the displacement of the pixels of the block between the current frame and at least one of the previous frame and the next frame.

3. A method according to claim 1, wherein:
   the estimation algorithm used to determine each of said motion vector fields uses, for the determination of said motion vector fields at the iteration index i, N motion vectors determined at iteration i−1 and corrected as a function of the displacement of the pixels of the block between the current frame and at least one of the previous frame and the next frame, the motion vector chosen being that which results in a minimization of criterion expressing the differences in luminance between blocks corresponding in the successive images through the corresponding estimated displacement vectors.

4. A method according to claim 1, further comprising the step of:
   transmitting said final motion vector field of each of said blocks.

5. A method according to one of claims 2 and 3, wherein:
   the correction of the motion vectors is performed by reducing the motion vectors by a quantity dependent on displaced interframe differences in luminance by reducing the motion vectors by a quantity dependent on the sums of differences in luminance between the pixels of the current block and the pixels of the blocks corresponding to the current block and displaced by the motion vector, in at least one of the previous frame and the next frame.

6. A method according to claim 5, wherein:

the correction of the motion vector is dependent on horizontal and vertical components of the luminance gradients calculated in at least one of the previous and following frames.

7. A method according to claim 6, wherein:

the gradient is calculated using the four pixels having a position corresponding to integer values of x and y which are closest to one of the displaced pixels and by applying the formulae below:

if the displaced pixel is in the neighborhood of I1

$$Gx=(I2-I1) \; Gy=(I1-I3)$$

if the displaced pixel is in the neighborhood of I2

$$Gx=(I2-I1) \; Gy=(I2-I4)$$

if the displaced pixel is in the neighborhood of I3

$$Gx=(I4-I3) \; Gy=(I1-I3)$$

if the displaced pixel is in the neighborhood of I4

$$Gx=(I4-I3) \; Gy=(I2-I4)$$

if the displaced pixel is in the middle portion between I1 and I3 or I2 and I4

$$Gx=((I2-I1)+(I4-I3))/2 \; Gy=one \; of \; (I1-I3) \; and \; (I2-I4)$$

if the displaced pixel is in the middle portion between I1 and I2 or I4 and I3

$$Gx=one \; of \; (I2-I1) \; and \; (I4-I3) \; Gy=((I1-I3)+(I2-I4))/2$$

if the displaced pixel is equidistant from I1, I2, I3, I4

$$Gx=((I2-I1)+(I4-I3))/2$$

$$Gy=((I1-I3)+(I2-I4))/2.$$

8. A method according to claims 2 or 3, wherein:

the correction of the motion vector is carried out by block matching, over a limited window.

9. A method according to claim 8, wherein:

for a first processed image, the N initialising motion vectors are zero.

10. A method according to claims 2 or 3, wherein:

when the estimation algorithm used is non-symmetric, the differences in luminance between blocks as well as the corrections are calculated over one of the previous frame and the next frames and are set to one of zero and a same value for the other frame.

11. A method according to any one of claims 1 to 3, wherein:

the final motion-vector field is rendered homogeneous by eliminating from the final motion-vector field, least frequently appearing vectors and by replacing the least frequently appearing vectors with closest vectors, of larger frequency.

* * * * *